US012623867B2

(12) United States Patent
Kampmann et al.

(10) Patent No.: US 12,623,867 B2
(45) Date of Patent: May 12, 2026

(54) CABLE STACKER, CABLE-PROCESSING APPARATUS COMPRISING A CABLE STACKER, AND METHOD FOR SAFELY CONVEYING A CABLE

(71) Applicant: Schleuniger AG, Thun (CH)

(72) Inventors: Roland Kampmann, Witten (DE); Manuel Bügler, Essen (DE); Michael Böhm, Hückeswagen (DE)

(73) Assignee: Schleuniger AG, Thun (CH)

( * ) Notice: Subject to any disclaimer, the term of this patent is extended or adjusted under 35 U.S.C. 154(b) by 51 days.

(21) Appl. No.: 18/549,404

(22) PCT Filed: Mar. 9, 2021

(86) PCT No.: PCT/IB2021/051953
§ 371 (c)(1),
(2) Date: Sep. 7, 2023

(87) PCT Pub. No.: WO2022/189829
PCT Pub. Date: Sep. 15, 2022

(65) Prior Publication Data
US 2024/0150137 A1 May 9, 2024

(51) Int. Cl.
*B65G 47/44* (2006.01)
*B65G 21/20* (2006.01)
(Continued)

(52) U.S. Cl.
CPC ....... *B65G 57/186* (2013.01); *B65G 21/2072* (2013.01); *B65G 47/24* (2013.01);
(Continued)

(58) Field of Classification Search
CPC .... B65G 47/683; B65G 47/82; B65G 47/945; B65G 47/962; H01R 43/28; B27D 43/285
(Continued)

(56) References Cited

U.S. PATENT DOCUMENTS

| | | | | |
|---|---|---|---|---|
| 4,765,053 A | * | 8/1988 | Hoffa | B21D 43/285 |
| | | | | 83/155.1 |
| 4,777,711 A | * | 10/1988 | Forkner | H01R 43/28 |
| | | | | 414/745.9 |

(Continued)

FOREIGN PATENT DOCUMENTS

| | | | | |
|---|---|---|---|---|
| CH | 690 947 A5 | 2/2001 | | |
| DE | 19624973 A1 | * | 1/1998 | H01R 43/28 |

(Continued)

OTHER PUBLICATIONS

International Search Report Corresponding to PCT/IB2021/051953 mailed Jan. 18, 2022.

(Continued)

*Primary Examiner* — Stephen F. Gerrity
*Assistant Examiner* — Patrick B Fry
(74) *Attorney, Agent, or Firm* — Secant IP, PLLC

(57) ABSTRACT

A cable stacker (20) having a first belt conveyor (21) for conveying the cable along a conveying direction X, the first belt conveyor (21) being designed to receive a belt, and the first belt conveyor (21) having a conveyor path with an input path portion and an output path portion. A main frame (23) is provided on which the first belt conveyor (21) is arranged, a counter barrier (40*a*) being provided for guiding the cable. In the region of the input path portion, the first belt conveyor (21) has a first drop barrier (31*a*) for preventing uncontrolled slipping of the cable from the conveyor path (22), the first drop barrier (31*a*) being movable relative to the counter barrier (40*a*) at least into an active position.

17 Claims, 10 Drawing Sheets

Figure 2:
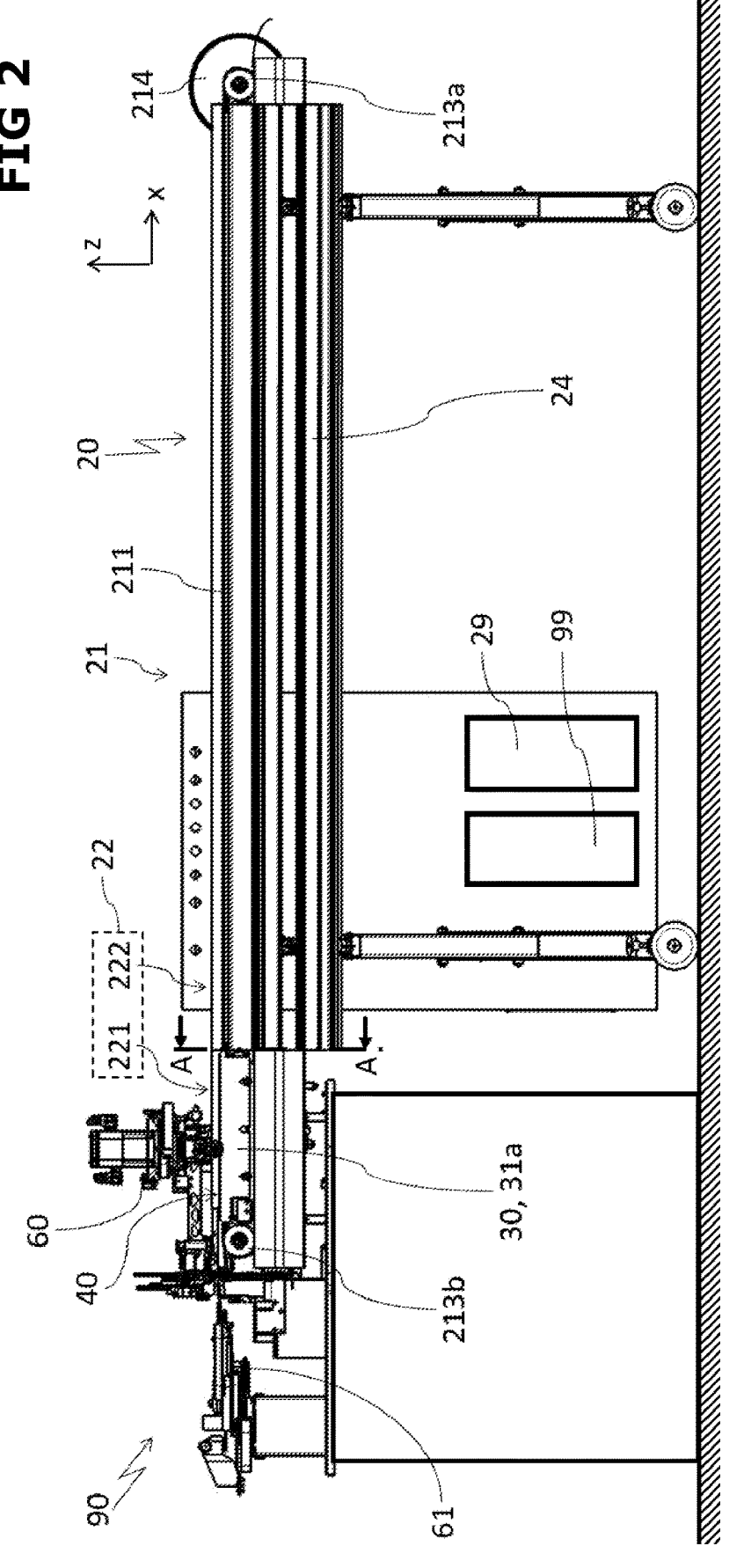

(51) Int. Cl.

| | |
|---|---|
| *B65G 47/24* | (2006.01) |
| *B65G 47/68* | (2006.01) |
| *B65G 47/82* | (2006.01) |
| *B65G 47/94* | (2006.01) |
| *B65G 47/96* | (2006.01) |
| *B65G 57/18* | (2006.01) |
| *H01R 43/28* | (2006.01) |

(52) U.S. Cl.
CPC ...... *B65G 47/44* (2013.01); *B65G 2201/0217* (2013.01); *B65G 2203/042* (2013.01)

(58) Field of Classification Search
USPC ................................ 53/447; 414/790.5, 802
See application file for complete search history.

(56) References Cited

U.S. PATENT DOCUMENTS

| | | | | |
|---|---|---|---|---|
| 4,793,759 | A * | 12/1988 | Hoffa | B65G 57/186 |
| | | | | 83/155.1 |
| 5,025,549 | A * | 6/1991 | Hornung | H01R 43/052 |
| | | | | 81/9.51 |
| 5,782,339 | A * | 7/1998 | Drewitz | B65G 21/2072 |
| | | | | 198/836.3 |
| 6,015,039 | A * | 1/2000 | Bonnet | B65G 47/78 |
| | | | | 198/370.09 |
| 7,578,112 | B2 * | 8/2009 | Korten | B65B 39/12 |
| | | | | 53/244 |
| 9,640,954 | B2 * | 5/2017 | Fischer | H02G 1/1248 |
| 10,577,194 | B2 * | 3/2020 | Stronkhorst | B65G 47/962 |
| 10,766,708 | B2 | 9/2020 | Cosa et al. | |
| 11,142,358 | B2 * | 10/2021 | Schubert | B65B 11/12 |
| 11,309,675 | B2 | 4/2022 | Feubli | |
| 2019/0092508 | A1 * | 3/2019 | Schubert | B65B 11/105 |
| 2021/0214110 | A1 * | 7/2021 | Rehn | B65B 9/04 |

FOREIGN PATENT DOCUMENTS

| | | | |
|---|---|---|---|
| DE | 10 2017 202 502 A1 | 8/2018 |
| EP | 3 648 270 A1 | 5/2020 |

OTHER PUBLICATIONS

Written Opinion Corresponding to PCT/IB2021/051953 mailed Jan. 18, 2022.
International Search Report Corresponding to PCT/IB2022/052114 mailed Jun. 20, 2022.
Written Opinion Corresponding to PCT/IB2022/052114 mailed Jun. 20, 2022.

* cited by examiner

FIG 1

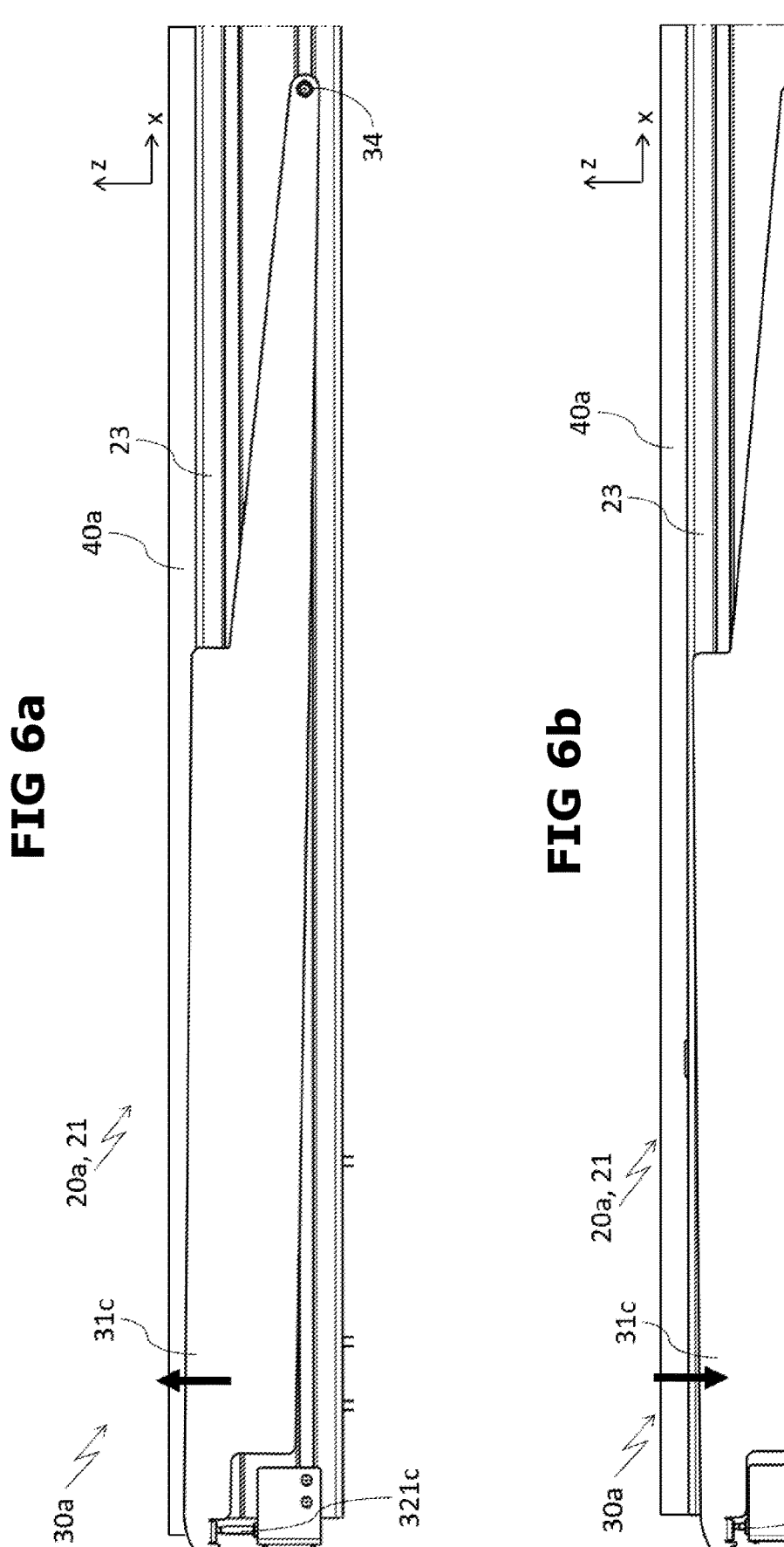

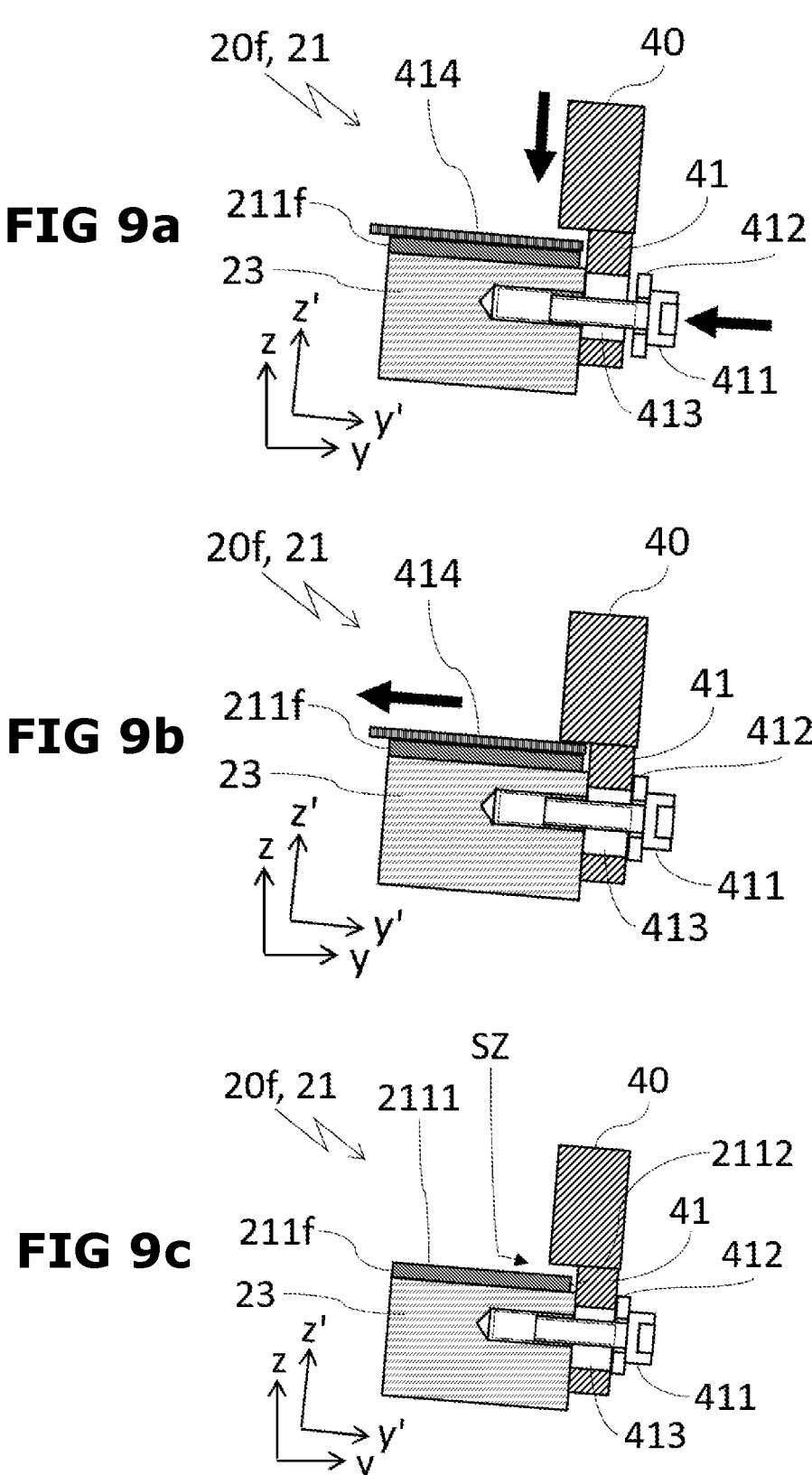

CABLE STACKER, CABLE-PROCESSING APPARATUS COMPRISING A CABLE STACKER, AND METHOD FOR SAFELY CONVEYING A CABLE

The invention relates to cable stackers, cable processing apparatus comprising a cable stacker and a method for safely conveying a cable according to the independent claims.

Cable stackers are typically stand-alone devices and are typically arranged on cable processing devices. Cable stackers of this type have a belt conveyor with a first conveyor roller and at least one further conveyor roller, wherein at least one of the two conveyor rollers is driven by a conveyor drive device. A belt is typically disposed on the conveyor rollers and moves a processed cable along a conveyor path when the belt conveyor is activated.

U.S. Pat. No. 4,793,759 A discloses a cable stacker having a first belt conveyor for conveying the cable along a conveying direction, wherein the first belt conveyor has a conveyor path with an input path portion and an output path portion. A base frame is provided on which the first belt conveyor is arranged, wherein a counter barrier is provided for guiding the cable.

A disadvantage of this known solution is that such a mechanism for dropping the cable from the conveyor path is error-prone in a cable processing process with a high production frequency.

DE 10 2017 202 502 A1 relates to a conveying device for cables, which includes a conveyor belt for conveying a piece of cable. The conveyor comprises a profile element which can be moved transversely to the conveying direction over the conveyor belt in order to convey the piece of cable controlled by the conveyor belt into a collecting flap.

A disadvantage of this known solution is that such a mechanism for dropping the cable from the conveyor belt is too slow in a cable processing process with a high production frequency.

The object of the present invention is to provide an improved cable stacker which, in particular, does not have at least one of the aforesaid disadvantages. In particular, a cable stacker is modified into a high-capacity cable stacker because the depositing speed is increased and misplacement can be reduced.

The object is achieved by the features of the independent claims. Advantageous further developments are presented in the figures and in the dependent claims.

A cable stacker according to the invention comprises a first belt conveyor for conveying the cable along a conveying direction, wherein the first belt conveyor is suitable for receiving a belt and the first belt conveyor has a conveyor path with an input path portion and an output path portion. Furthermore, a main frame is provided on which the first belt conveyor is arranged, wherein a counter barrier is provided for guiding the cable. In the area of the entry path portion, the first belt conveyor has a first drop barrier to prevent the cable from slipping from the conveyor path in an uncontrolled manner, wherein the first drop barrier can be moved at least into an active position relative to the counter barrier.

The first drop barrier can be moved vertically to the counter barrier and/or horizontally to the counter barrier. When the first drop barrier in its active position, it serves as an obstacle for the leading end of a cable. In addition to guiding the cable, a counter barrier is also suitable for preventing the cable from slipping off the conveyor path in an uncontrolled manner. The leading end of the cable cannot surmount the drop barrier in the conveying process along the conveying direction when the drop barrier is in its active position. Uncontrolled slipping of the cable from the conveyor path can be avoided in this way, so that the depositing speed can be increased and incorrect deposits can be reduced at the same time. For example, the first drop barrier is arranged adjacent to a first conveyor roller of the belt conveyor. A further conveyor roller can be arranged in the area of the output web portion, which can be actively driven or moved by a conveyor drive device.

The counter barrier is preferably arranged in the input path portion of the conveyor path so that it is arranged at least opposite the first drop barrier on the cable stacker.

Thus, the guiding of the cable is further improved.

The first drop barrier can preferably be moved orthogonally to the conveying direction from the active position into an inactive position. The first drop barrier can be moved towards the conveyor path or away from the conveyor path, for example lowered or raised (vertically). The first drop barrier does not cross the conveyor path of the belt conveyor, so that the processed cable can be conveyed unhindered onto the conveyor path.

Alternatively or in addition, the first drop barrier can be moved along the conveying direction of the conveyor path. The first drop barrier can have a small and compact structure. Depending on the cable length and/or cable type the first drop barrier can be positioned along the conveying direction of the conveyor path on the cable stacker.

Preferably, the first drop barrier with a drive device is mechanically connected to at least one drive for moving the first drop barrier. The drive can be designed as an electric drive, so that the first drop barrier can be moved easily.

The drive device is preferably a pneumatic drive device, which has at least one pneumatic cylinder as a drive. The first drop barrier can thus be easily transferred from the active position to the inactive position.

This drive device preferably comprises a valve. The valve can be designed as a compressed air valve and can be part of a valve manifold, for example. With a valve, the electrical control signals can be easily converted into compressed air levels, which ensures a controlled compressed air supply to the pneumatic cylinder.

A control device is preferably provided, which is electrically connected at least to the drive device for the exchange of control data. The drive device can thus be controlled in a reproducible manner. For example, the control device has a computing unit and is connected to a memory and/or a database for the exchange of control data.

A sensor device is preferably provided by means of which at least the inactive position of the first drop barrier can be detected. The sensor device recognizes the inactive position of the first drop barrier and forwards corresponding sensor data to the control device. The sensor data can be further processed in the computing unit of the control device. Alternatively or additionally, a sensor device is provided by means of which at least the active position of the first drop barrier can be detected. The sensor device recognizes the active position of the first drop barrier and forwards corresponding sensor data to the control device. The sensor data can be further processed in the computing unit of the control device to form control commands, at least for the first drop barrier. For this purpose, this sensor device is electrically connected to the control device for exchanging sensor data.

Preferably, the counter barrier is movably arranged on the first belt conveyor. The counter barrier can be moved manually by a user, or connected to an adjustment mechanism that moves the counter barrier in a motor-driven manner or pneumatically. In this way, for example, a gap can be set between the counter barrier and the conveyor path, in particular when a new belt has been arranged on the first belt conveyor, so that jamming of the processed cable on the belt conveyor can be prevented.

The first belt conveyor is preferably arranged on the main frame such that it is tilted relative to the horizontal. The first belt conveyor is twisted or tilted about the conveying direction, so that it is more difficult for the cable to slip from the conveyor path. In particular, the tilt is between 1 degree and 15 degrees. The tilt is preferably 6 degrees. Premature slipping of the cable can thus be prevented or the desired controlled slipping of the cable from the conveyor path is still possible.

Preferably a collection area is provided for collecting the cables, wherein the first drop barrier is arranged adjacent to the collection area. Those processed cables which should overcome the first drop barrier can be stored safely in the collection area.

The collection area is preferably designed as a movable collecting trough. The collecting trough can be easily tilted with a pneumatic cylinder, for example moved from one end position (tilted up) to another end position (tilted down). For example, a repository can also be provided to store the processed cables as they are conveyed from the tilted-down collecting trough to the repository.

A belt for transporting the cable along the conveying direction is preferably arranged on the first belt conveyor. A belt can be positioned on the belt conveyor in a simple and reproducible manner and fixed using a tensioning device.

Preferably the belt is a flat band belt. A flat band belt has no longitudinal profile (or no belt bead) and is simply constructed and cheap to manufacture compared to a belt with a longitudinal profile. In particular, the flat band belt has a structure with increased adhesion on its supporting side opposite the running side or its outer surfaces, so that the processed cables can be conveyed more efficiently. The running side of a flat band belt is typically in operative connection with at least one conveyor roller. Alternatively, the belt can be a toothed belt.

A movable protective cover is preferably arranged along the conveying direction of the first belt conveyor. The protective cover can be removed from the input path portion of the first belt conveyor to allow a user easy access to the conveyor path. In particular, the protective cover is pivotable. For this purpose, the protective cover can be connected to the main frame using a hinge and a snap-in and/or spring mechanism with integrated damper elements (e.g. gas pressure springs), wherein the damper element fixes the unfolded position and/or reduces the expenditure of force when unfolding or distributes it more evenly over the entire movement.

The first belt conveyor preferably has at least one second drop barrier to prevent the cable from slipping from the conveyor path in an uncontrolled manner, the second drop barrier being movable into an active position relative to the counter barrier. The second drop barrier can be arranged adjacent to the first drop barrier in order to better prevent the uncontrolled slipping off of the cable.

Preferably at least one fixing device is provided for fixing at least the first drop barrier in the active position. The fixing device comprises, for example, an independent mechanical, electrical or magnetic fixing unit which prevents the first drop barrier from being transferred into its inactive position by either blocking its drive device or blocking the movement of the first drop barrier. The movable collecting trough can also serve as a fixing device, which prevents the transfer of the first drop barrier into its inactive position when this is, for example, tilted up.

The first belt conveyor preferably comprises a plurality of module frames which can be connected to the main frame and are therefore held on the cable conveyor in a stable and stationary manner. Such module frames can be produced in standardized sizes, so that the conveyor path of the first belt conveyor is individually adjustable or extendable. The cable stacker with a modular structure also includes only one belt, one tensioning device and at least one belt drive, so that the production costs are not significantly increased, but the customer benefit is significantly improved, additional conveyor rollers can be dispensed with.

In particular, the module frames can be separated from one another and/or from the main frame, so that the modularity is improved and transport and assembly before the cable stacker is put into operation for the first time is simplified.

Preferably at least one additional belt conveyor is provided, which can be separated from the first belt conveyor, for transporting the cable along the conveying direction, with the first belt conveyor and the additional belt conveyor being suitable for receiving a single belt so that the production costs are not significantly increased.

Preferably a single flat band belt is provided for transporting the cable along the conveying direction. Flat band belts can be installed easily and reproducibly.

Preferably a further drop barrier is provided on one of the module frames and/or on one of the other belt conveyors to prevent the cable from slipping from the conveyor path in an uncontrolled manner, the further drop barrier being movable at least into an active position relative to the counter barrier. An uncontrolled slipping of the cable from the conveyor path outside the input path portion can thus be prevented.

Preferably at least one dropping device is provided for dropping the cable from at least one of the belt conveyors, the dropping device being electrically connected to the control device for exchanging control data. The dropping device can be configured as a swivel arm or a linearly movable dropping arm, so that a controlled dropping is made possible and the dropping device is arranged on the cable stacker in a space-saving manner.

An inventive cable processing device having at least one cable processing station and at least one cable processing tool for processing the cable and a cable stacker as described here comprises at least one dropping device for dropping the cable from at least one belt conveyor, which is arranged on the cable processing device or on the cable stacker. The at least one dropping device can thus be part of the cable processing apparatus or part of the cable stacker. For example, a gripper arranged at the cable processing station is used as a dropping device and can be used for cable transport between different processing stations and/or for other functions. For example, the gripper is arranged on a swivel arm with a vertical axis of rotation.

The dropping device is preferably connected to the control device of the cable stacker for the exchange of control data. The at least one dropping device can thus be installed or put into operation independently of the cable processing apparatus.

As an alternative to this, the cable stacker is electrically connected to a central control of the cable processing device for the exchange of control data, wherein the at least one dropping device is connected to the central control for the exchange of control data. A separate control device for the cable stacker can be dispensed with, so that the manufacturing costs of the cable stacker are optimized.

An inventive method for safely conveying a cable on a cable stacker, wherein the cable stacker has at least a first belt conveyor and a first drop barrier, comprises at least the following steps:

a) selecting at least one cable parameter;

b) moving the first drop barrier into an active position relative to a counter barrier;

c) conveying the cable on the first belt conveyor.

An uncontrolled slipping of the cable from the conveyor path of the belt conveyor can be avoided, so that the depositing speed can be increased and incorrect deposits are reduced at the same time.

The cable parameters here are the cable type (coaxial cable, multi-conductor cable, etc.), the cable geometry (structure, dimensioning, cable length, etc.) as well as the overall structure of the processed cable, whereby the overall structure can also comprise a cable connector arranged on the cable. In particular, the cable stacker is a cable stacker described here or a cable stacker as part of a cable processing apparatus as previously described.

The at least one cable parameter is preferably retrieved from a database. The control device or the central control are connected to the database for exchanging cable parameters, so that already stored cable parameters can be accessed and the initialization of the cable stacker before the start of production is improved.

After step b), at least one cable processing tool of a cable processing station is preferably activated. The processing of the cable can therefore only be started when the first drop barrier is in its active position, so that incorrect placement on the cable stacker is further reduced. In particular, the cable processing tool of the cable processing station of the cable processing device described here is activated.

Preferably, step c) is followed by the step of moving the first drop barrier into an inactive position (step d). Alternatively or additionally, after step d), the cable is dropped by means of the dropping device (step e)). This reliably drops the cable without getting caught on the drop barrier.

Another cable stacker according to the invention comprises a first belt conveyor for conveying the cable along a conveying direction, the first belt conveyor being suitable for receiving a belt. Furthermore, a main frame is provided on which the first belt conveyor is arranged, wherein at least one first guide element is provided. The first guide element can be positioned along the conveying direction of the cable to be conveyed. With the aid of the first guide element, the guidance of the cable in the input path portion is improved when the cable is dropped, thus ensuring optimal placement quality. When the cable is dropped, for example triggered by a pivoting movement of a dropping device, a horizontal snaking movement is formed from the trailing end of the cable to the leading end of the cable. The geometric form, for example, a damped oscillation, of the snaking movement is pre-determined by the dropping impulse of the dropping device on the cable and the position of the first guide element, so that an unwanted slipping of the cable is prevented. The position of the first guide element should be set depending on the cable length or cable parameters, wherein the position of the first guide element for short cables is different from the position of the first guide element for long cables and in particular the position of the first guide element for thin cables is different from the position of the first guide element for thick cables.

In the area of the first guide element a sensor device with at least one sensor is provided for determining a first position of the guide element, the sensor device being electrically connected to the control device or to the central control of a cable processing apparatus. With the aid of the sensor, a positioning error of the first guide element relative to the conveyed cable can be detected, so that an undesired slipping off of the cable is better prevented.

Alternatively or additionally, a drive device for moving the guide element is connected to the first guide element. The drive device enables precise and reproducible positioning of the first guide element on the cable stacker, in particular depending on the cable to be stacked. For this purpose, the drive device preferably comprises a spindle or a pneumatic cylinder, the spindle enabling stepless positioning of the first guide element and a pneumatic cylinder being a cost-effective variant of a drive device.

For example, a light barrier, an inductive or magnetic sensor or a switch can be used as a sensor, which detects the first position of the first guide element and can interact with a detection element. Alternatively, the drive device can comprise the sensor, for example by detecting a position of a pneumatic cylinder or the rotational movement of a spindle. The control device or the central control comprise a computing unit and is connected to a database for the exchange of control data. The control data comprise control commands for controlling the drive device of the first guide element. The computing unit has a program that is suitable for evaluating the sensor data and checking or comparing it, for example, with a pre-selected cable parameter of the cable to be stacked, and for calculating the first position and comparing it with a reference value from a database. If, for example, the first position of the first guide element differs from the reference value, at least one warning is sent and, if necessary, a conveying operation of the belt conveyor is prevented or delayed. Otherwise, the first belt conveyor can start conveying the cable that has been processed or is to be stacked.

Preferably, the drive device for moving the guide element is electrically connected to the control device, so that the positioning can be carried out in a precisely controlled manner and can be adjusted in particular for short cables, long cables, thick cables or thin cables.

As an alternative to this, the drive device is electrically connected to a central controller of a cable processing device. In this way, control commands for moving the first guide element can be created and transmitted directly from the central controller of a cable processing apparatus and, if necessary, the first belt conveyor can be stopped. The drive device can comprise a pneumatic drive or also comprise an electric drive.

A protective cover is preferably provided and the first guide element is arranged on the protective cover. The first guide element can thus be removed together with the protective cover, so that improved accessibility to the conveyor belt is possible for the user. The protective cover is, for example, a protective cover as described above.

In particular, this protective cover is designed to be movable, preferably tiltable, and contains fixing, damping and/or spring elements. These fix the open position of the protective cover and/or reduce the expenditure of force required to open it and/or distribute the expenditure of force uniformly over the entire movement. This improves the ease of use for the user.

An inventive method for safely conveying a cable on a cable stacker as described herein comprises the following steps:

a) moving the first guide element into a first position, the first position being matched to the cable length of the cable to be conveyed;

b) checking the first position of the first guide element using the sensor device;

c) transferring control data to the control device;

d) conveying the cable on the first belt conveyor.

This leads to a reduction in incorrect deposits in the cable stacker. If step b) is carried out manually by a user, the check in step c) recognizes that the position measured with the sensor device does not match the required position. This results in stopping of the belt conveyor and the user can receive a warning/error message.

In particular, at least one cable parameter of the cable is selected before step a). The cable parameters here are the cable type (coaxial cable, multi-conductor cable, etc.), the cable geometry (structure, dimensioning, cable length, etc.) as well as the overall structure of the processed cable, whereby the overall structure can also comprise a cable connector arranged on the cable. In particular, the cable stacker is a cable stacker described here or a cable stacker as part of a cable processing apparatus as described previously.

The at least one cable parameter is preferably retrieved from a database. The control device or the central control are connected to the database for the exchange of cable parameters, so that cable parameters that have already been stored can be accessed and the initialization of the cable stacker before the start of production is improved.

The first guide element is preferably transferred into the first position in step b) with the aid of the drive device. This allows the first guide element to be adjusted fully automatically.

A cable stacker according to the invention comprises a first belt conveyor for conveying the cable along a conveying direction, the first belt conveyor being suitable for receiving a belt. Furthermore, a main frame is provided on which the first belt conveyor is arranged, wherein a counter barrier is provided for guiding the cable. The counter barrier is movable relative to the conveying direction to set a gap to the conveyor path of the first belt conveyor.

With the aid of the movable counter barrier, a gap can be set between the belt and the counter barrier when the belt is arranged on the first belt conveyor, so that undesirable jamming of the processed cable in this gap can be prevented. This leads to a reduction in incorrect deposits in the cable stacker.

Preferably, the counter barrier is movable normal to the conveying direction to vertically set a horizontal gap between the first belt conveyor and the counter barrier. Thus, an undesirable jamming of the processed cable in the horizontal gap can be prevented.

Alternatively or in addition, the counter barrier is movable normal to the conveying direction in order to set a vertical gap between the first belt conveyor and the counter barrier horizontally. Undesirable jamming of the processed cable in the vertical gap can thus be prevented.

The belt is preferably designed as a flat band belt. A flat band belt has at least one belt transport surface and at least one belt front surface. A flat band belt has no longitudinal profile and compared to a belt having a longitudinal profile is simply constructed and cheap to produce. Such flat band belts are exchanged by a user by hand. A belt with a longitudinal profile has at least one step-like projection on which the belt front surface is arranged.

Preferably, the counter barrier is movable normal to the belt transport surface to vertically set a horizontal gap between the belt and the counter barrier. Undesirable jamming of the processed cable in the horizontal gap can thus be prevented.

Alternatively or additionally, the counter barrier is movable normal to the belt front surface to horizontally adjust a vertical gap between the belt and the counter barrier. Undesirable jamming of the processed cable in the vertical gap can thus be prevented.

The counter barrier is preferably arranged in the input path portion of the conveyor path, so that it is arranged opposite the collection area on the cable stacker. Thus, the guiding of the cable is further improved. In particular, the counter barrier extends along the conveyor path of the belt conveyor.

Preferably, an adjustment mechanism for moving the counter barrier is arranged on the counter barrier so that the counter barrier is easily adjustable relative to the belt conveyor.

Alternatively, the counter barrier is mechanically connected to an adjustment mechanism for moving the counter barrier. The adjustment mechanism can comprise a spindle drive on which the first counter barrier can be easily and steplessly adjusted.

This adjustment mechanism is preferably designed in such a way that this adjustment mechanism cannot be adjusted during the conveying operation of the first belt conveyor. An undesired adjustment of the counter barrier during operation can thus be prevented. The adjustment mechanism can be configured to be self-locking for this purpose.

The adjustment mechanism preferably comprises an elongated hole and a fastening device. For example, the adjustment mechanism is connected to the main frame of the cable stacker by means of at least one screw or bolt and a washer in the area of this elongated hole. The washer is designed such that the screw does not loosen when subjected to vibrations, for example as a ribbed washer or as a wedge lock washer (Nord-Lock). Several screws or bolts, washers and elongated holes are provided for each adjustment mechanism. If the fastening device is slightly loosened by the user, the adjustment mechanism and counter barrier attached thereto are free to move. As soon as the screw or bolt is fixed, the counter barrier is fixed and uniquely positioned relative to the main frame.

As an alternative or in addition to this, the adjustment mechanism can, for example, comprise a spindle or a screw with a high pitch and/or comprise a fixing element, such as a lock nut. A counter barrier with such an adjustment mechanism can also be easily adjusted by an untrained user with simple tools such as a torque wrench. As soon as the screw or bolt is fixed, the counter barrier is fixed and uniquely positioned relative to the main frame.

The adjustment mechanism preferably comprises an adjustment aid, so that the desired gap between the belt conveyor or the belt and the counter-surface can be adjusted in a reproducible manner. The adjustment aid can be pushed into the gap, in a motor-driven manner or manually by the user. The counter barrier is then pushed towards the adjustment aid until the counter barrier, adjustment aid and belt conveyor or belts touch each other. Before commissioning, the adjustment aid is now pulled out from the gap or removed. In this way, a reproducible gap of the optimum size for belts from different manufacturers can be created at any time and with little effort. If the belt is heavily worn (reduced thickness due to wear/abrasion), the adjustment process can also be repeated several times for the same belt.

The counter barrier preferably extends along the conveying path of the first belt conveyor, so that improved guidance of a cable on the belt conveyor over a longer conveying distance is ensured.

A method according to the invention for setting a gap on a cable stacker, in particular on a cable stacker as described above, comprises at least the following steps:

a) arranging a belt on a belt conveyor, b) transferring a counter barrier from a first position to a further position in order to set the gap between the belt and the counter barrier.

With aid of the movable counter barrier, a gap between the belt and the counter barrier can be easily adjusted when the belt is placed on the first belt conveyor, so that undesirable jamming of the processed cable in this gap is prevented. This leads to a reduction in incorrect deposits in the cable stacker and to increased operational reliability.

An adjustment aid is preferably arranged between the counter barrier and the belt before step b). In this way, a reproducible gap of the optimum size for belts from different manufacturers can be created at any time and with little effort. In case of heavy wear of the belt (reduced thickness due to wear/abrasion), the adjustment process can also be repeated several times with the same belt.

After step b), the adjustment aid between the counter barrier and the belt is preferably removed in order to prevent undesirable jamming of the processed cable with the adjustment aid.

The further position of the counter barrier preferably depends on at least one cable parameter, in particular on the cable diameter. The cable parameters here are the cable type (coaxial cable, multi-conductor cable, etc.), the cable geometry (structure, dimensioning, cable length, etc.) as well as the overall structure of the processed cable, wherein the overall structure can also include a cable connector arranged on the cable.

In particular, the adjustment mechanism is connected to a control device for exchanging control data. Such an adjustment mechanism comprises a drive device with a drive for moving the counter barrier, which drive can be controlled by the control device in a reproducible manner, for example depending on the cable parameters.

In particular, a sensor device is provided by means of which the gap between a conveyor belt and the counter barrier can be identified. The sensor device comprises, for example, a distance sensor for detecting the distance between the belt and the first counter barrier and sends the sensor data to the control device. The control device comprises a computing unit and is connected to a database for the exchange of control data. The control data comprise control commands for controlling the drive device of the counter barrier and/or control commands for controlling the conveyor rollers of the belt conveyor. The computing unit has a program that is suitable for evaluating the sensor data and calculating a gap width and comparing it with a reference value. If the gap width is too large for the cable to be processed, at least one warning is sent out and, if necessary, conveying operation of the belt conveyor is prevented or delayed. In particular, the sensor device is configured to measure the gap width directly. For example, the sensor device comprises an imaging sensor, such as a camera.

Further advantages, features and details of the invention result from the following description, in which exemplary embodiments of the invention are described with reference to the drawings.

Like the technical content of the claims and figures, the reference list is part of the disclosure. The figures and embodiments are described in a coherent and comprehensive manner. The same reference symbols denote the same components, while reference symbols with different indices indicate functionally identical or similar components. Enumerations such as first, second, . . . others only serve to distinguish between components.

Figure 3:
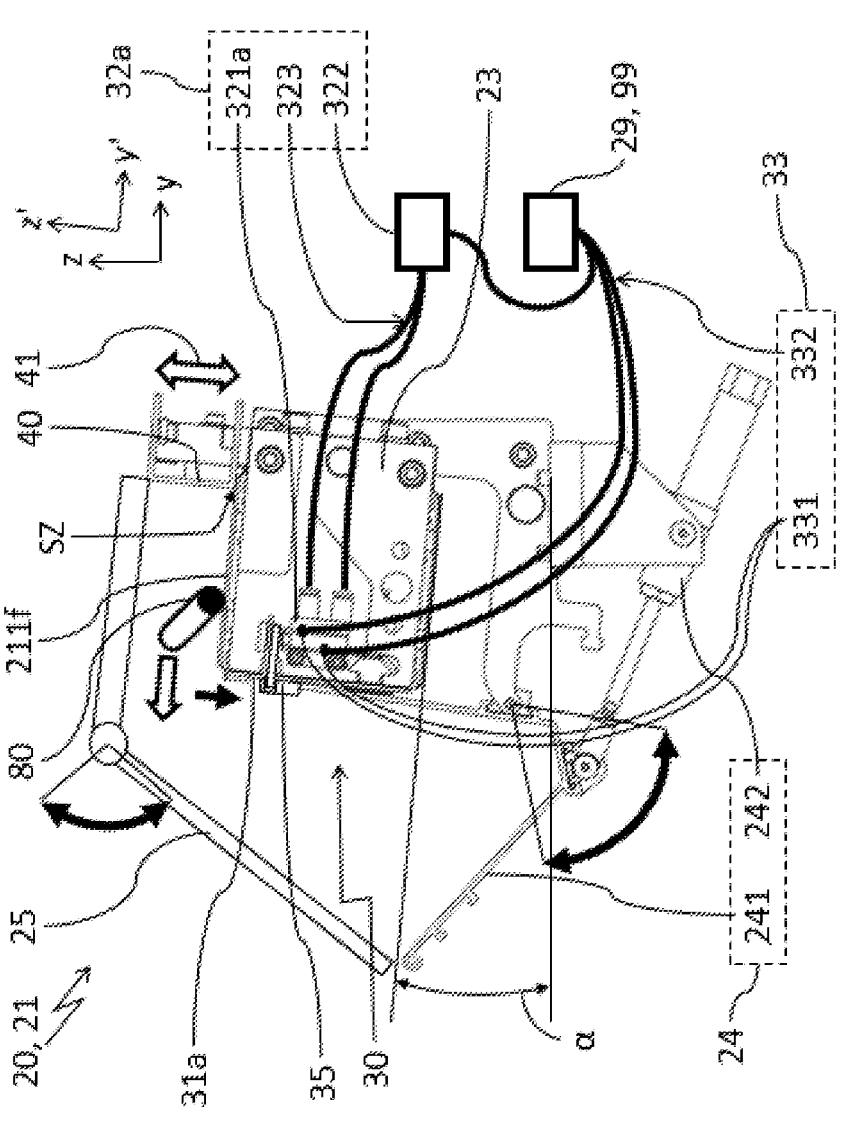
Figure 4:
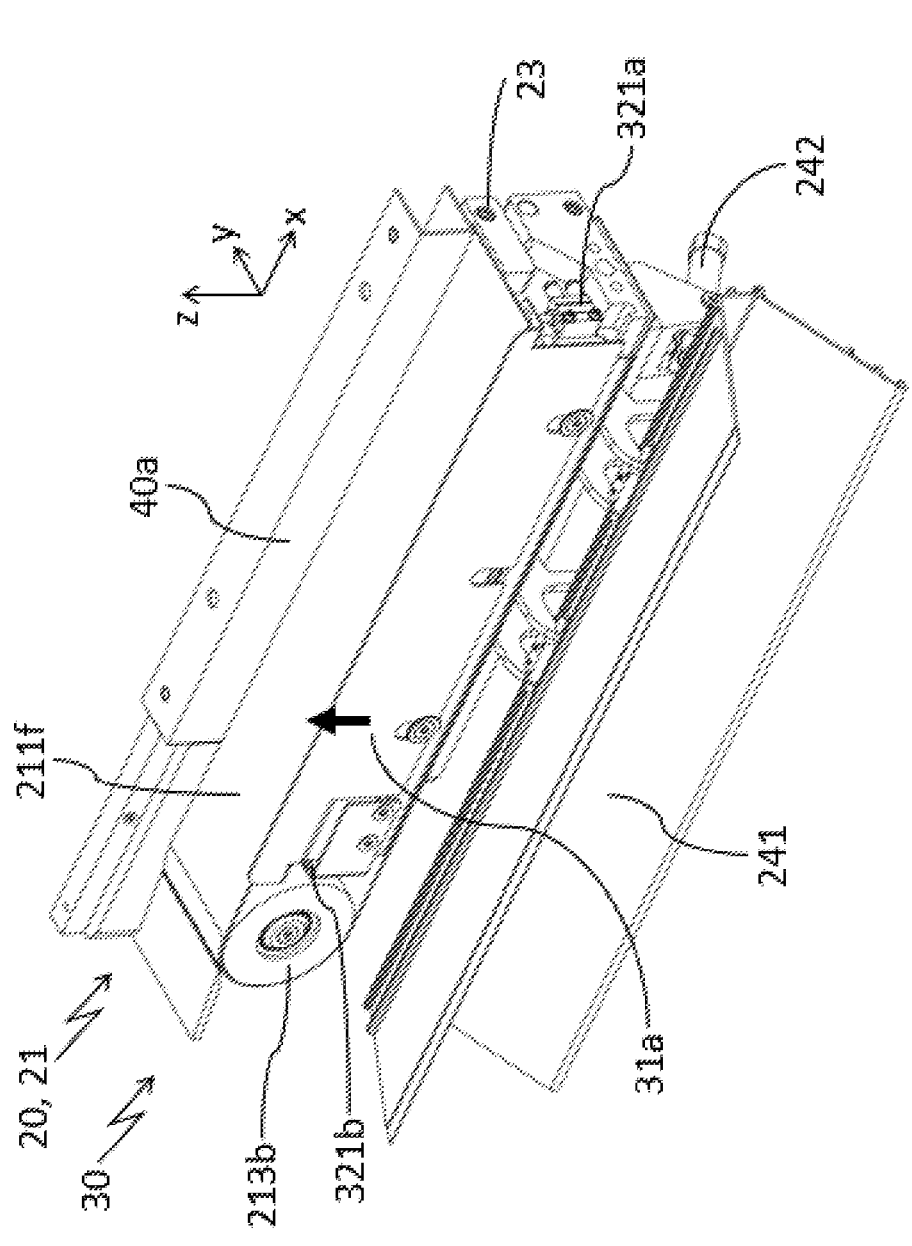
Figure 5A:
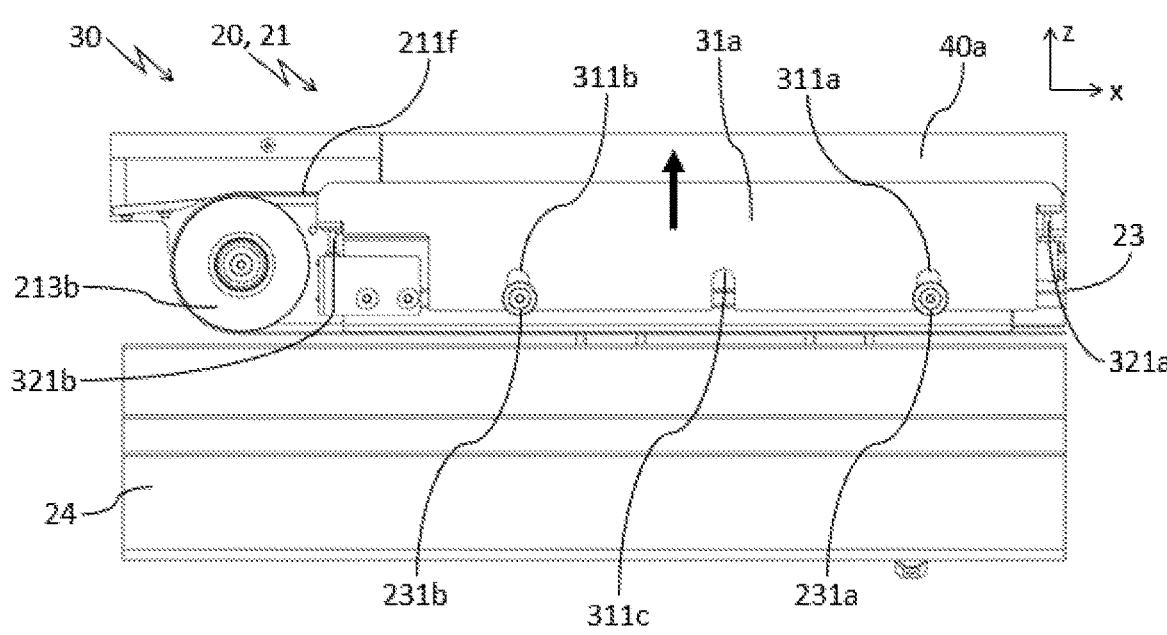
Figure 5B:
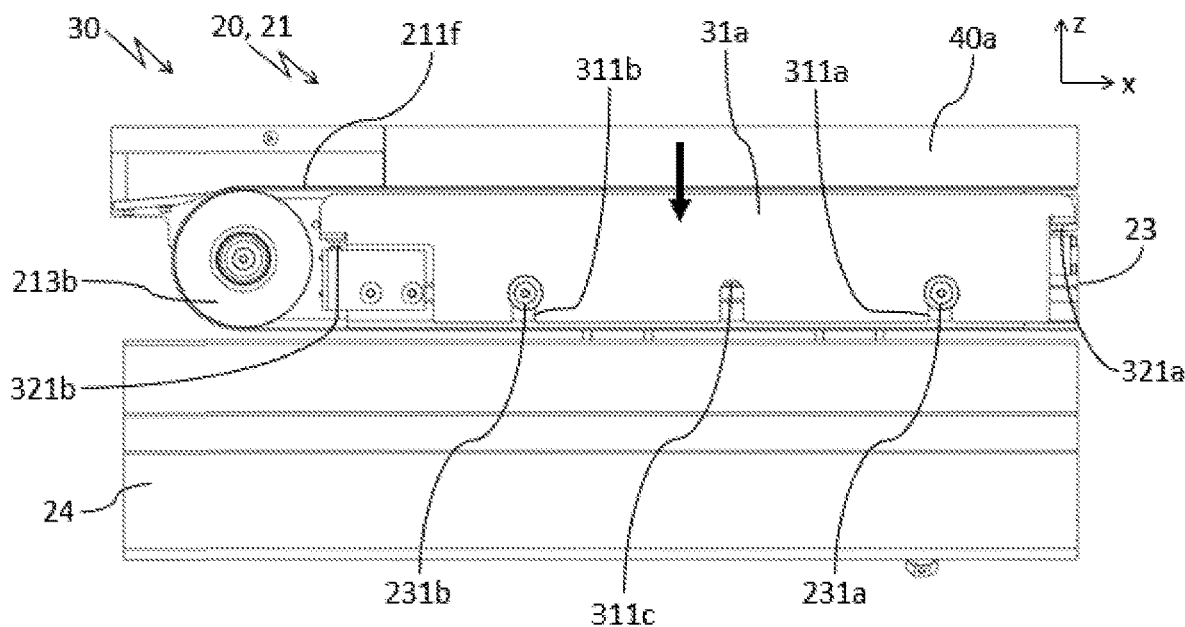
Figures 7A, 7B:
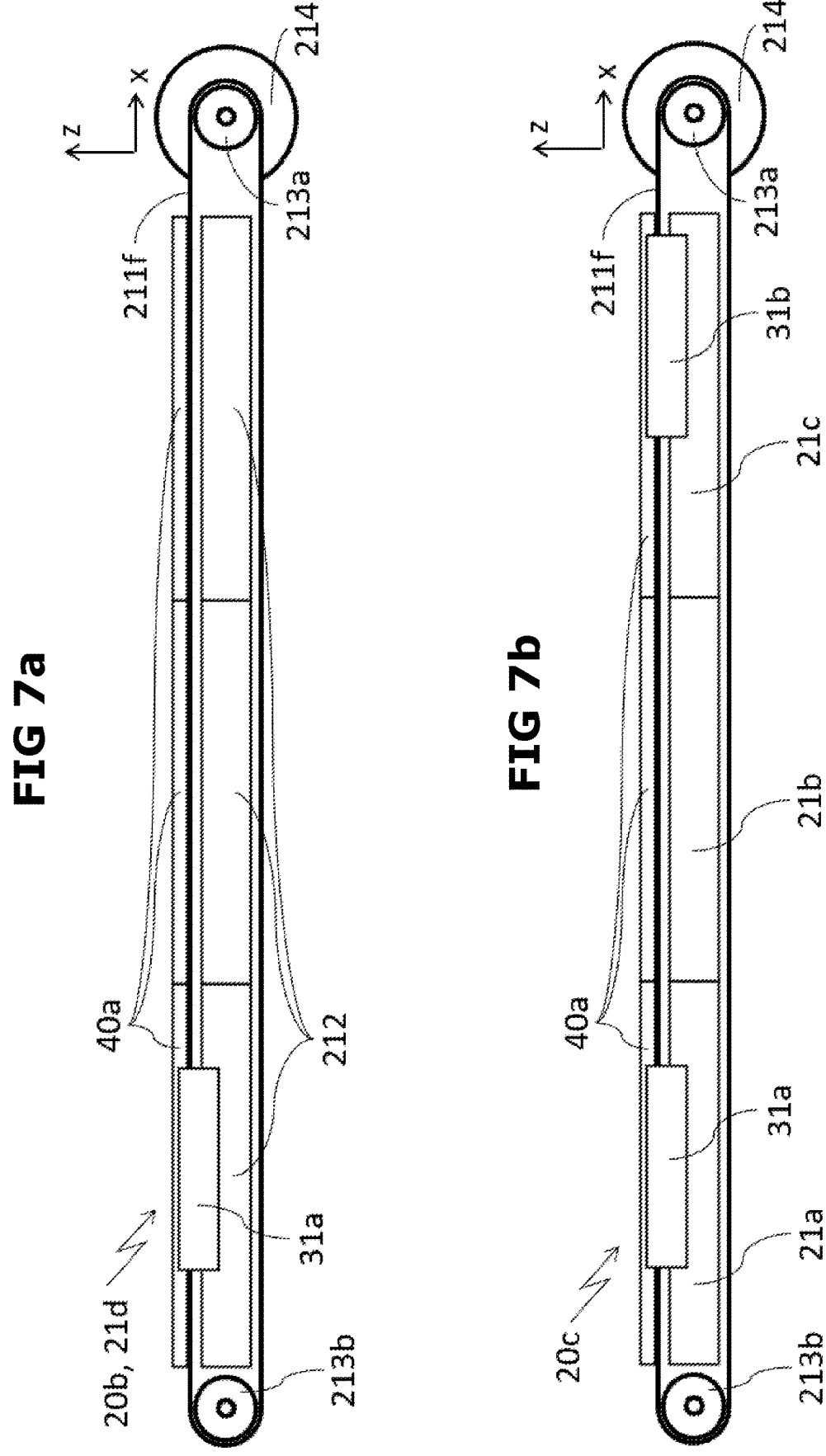
Figure 8A:
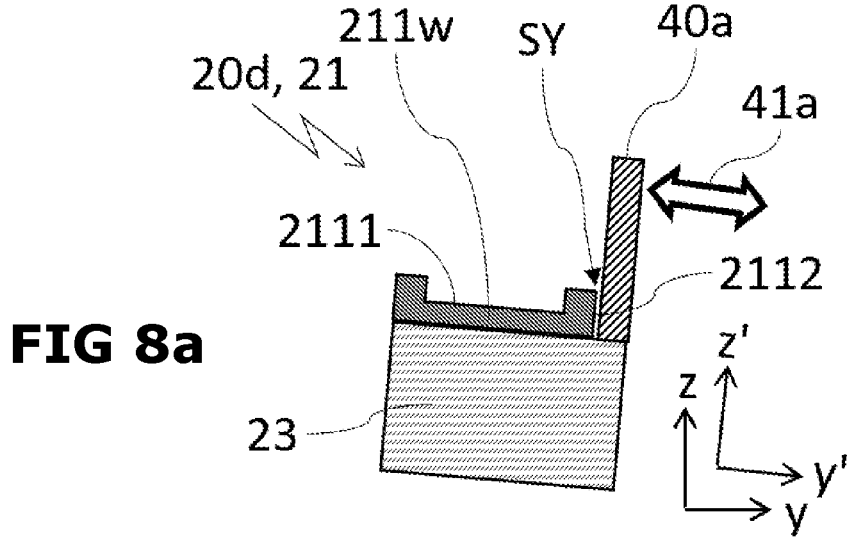
Figure 8B:
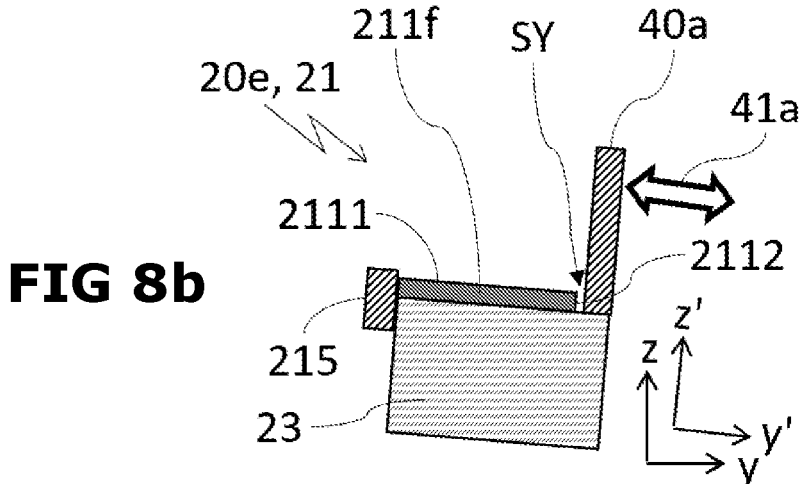
Figures 10A, 10B:
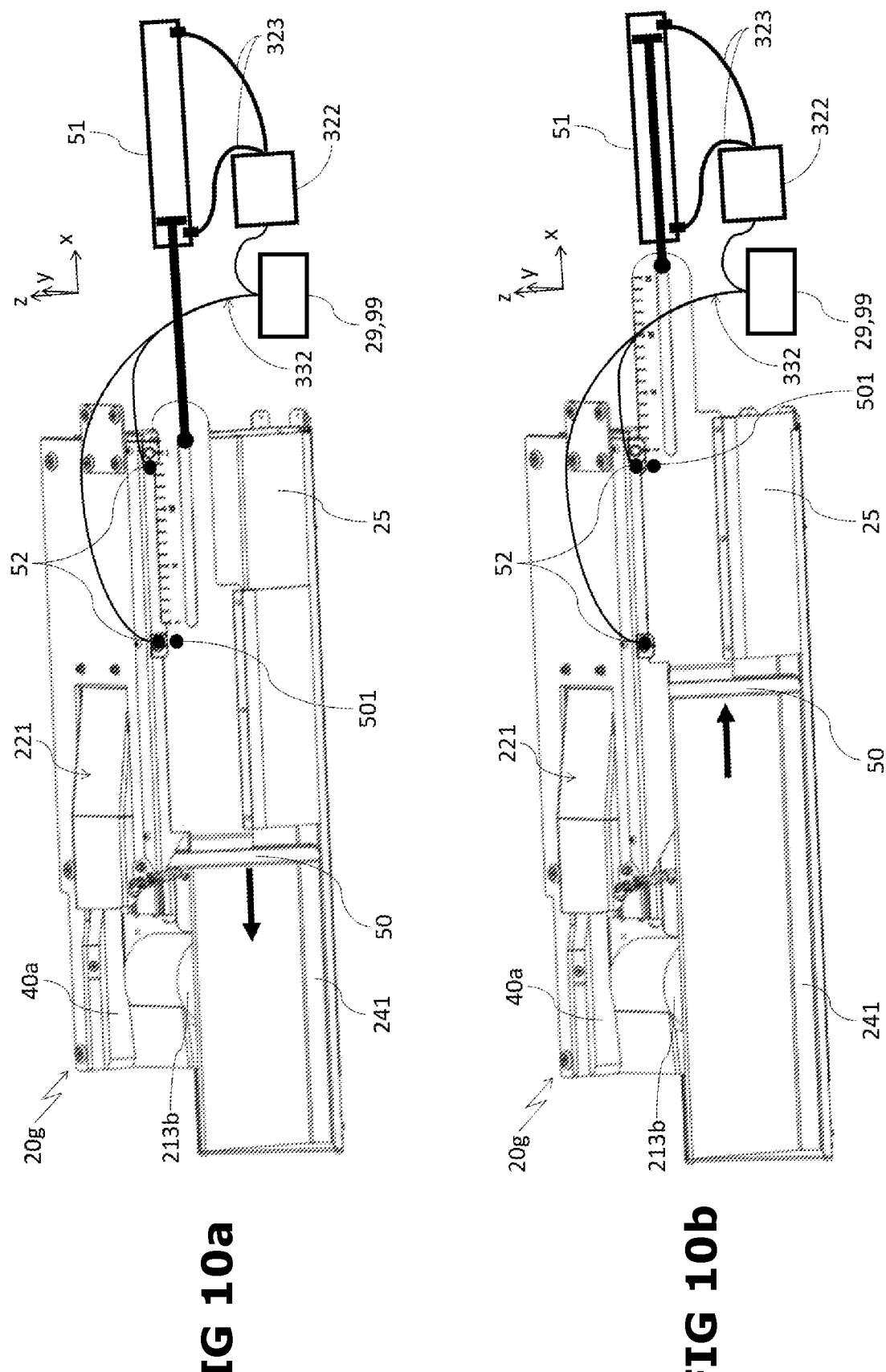

In the figures:

Figure 1:
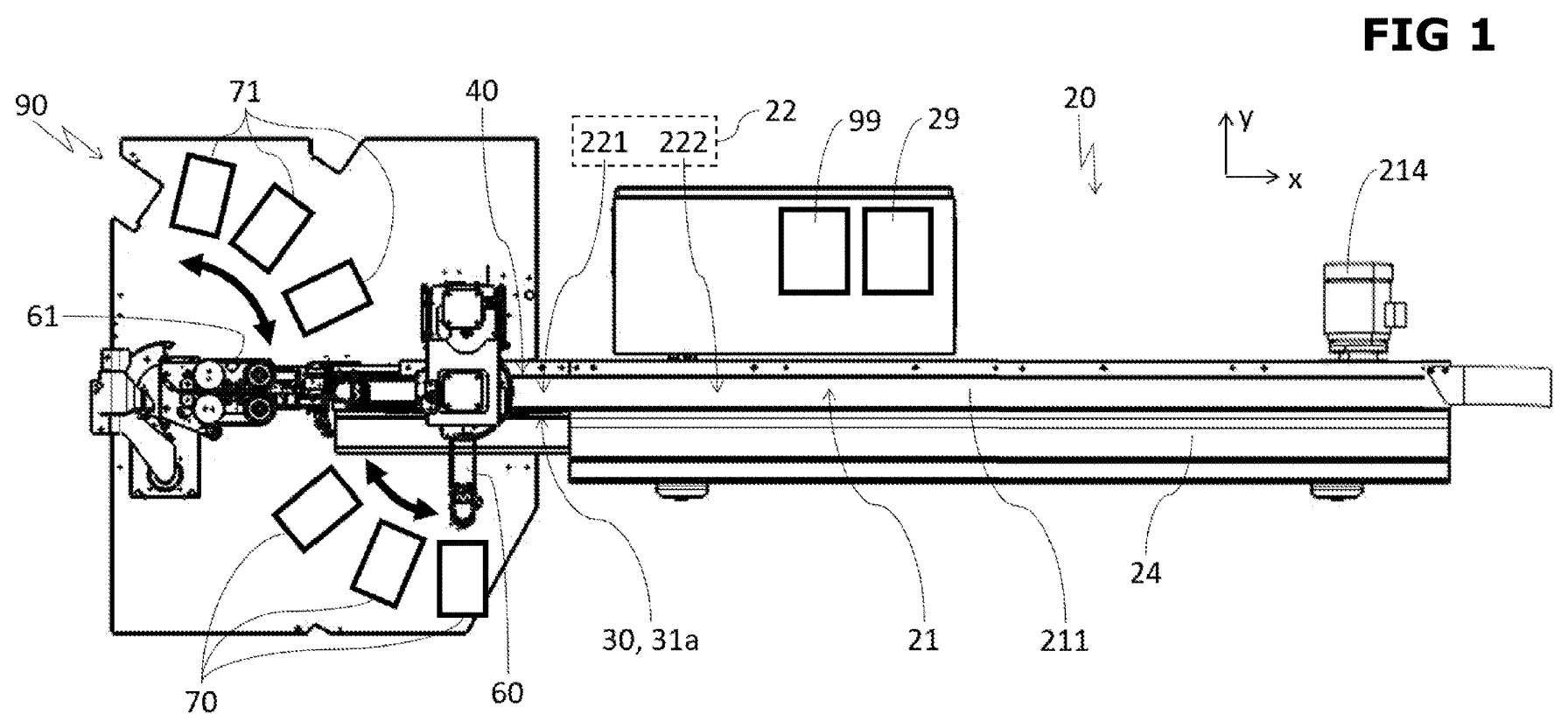

FIG. 1 shows a first embodiment of a cable processing device with a cable stacker according to the invention, in a schematic top view (XY plane), FIG. 2 shows a cable processing device according to FIG. 1 in a schematic side view (XZ plane), FIG. 3 shows the cable stacker according to FIG. 2 in a sectional view, corresponding to the sectional plane (AA) drawn in FIG. 2, FIG. 4 shows the cable stacker according to FIG. 3, as an isometric sectional view, with the protective cover hidden and the collecting trough folded down, FIG. 5a shows the drop barrier device of the cable stacker according to FIG. 4 with the first drop barrier in the active position in a side view, FIG. 5b shows the drop barrier device of the cable stacker according to FIG. 4 with the first drop barrier in the inactive position, in a side view, FIG. 6a shows an alternative embodiment of a drop barrier for the cable stacker according to FIG. 4 with the first drop barrier in the active position, in a side view, FIG. 6b shows the drop barrier device of the cable stacker according to FIG. 6a with the first drop barrier in the inactive position in a side view, FIG. 7a shows an alternative embodiment of a cable stacker according to FIG. 4 in a modular design, in a side view FIG. 7b shows a further alternative embodiment of a cable stacker according to FIG. 4 with a plurality of belt conveyors and a plurality of discharge barriers, in a side view, FIG. 8a shows an alternative embodiment of a cable stacker for a cable processing device according to FIG. 1, with a modified counter barrier, with a belt having a longitudinal profile, in a sectional view (Y-Z plane), FIG. 8b shows an alternative embodiment of a cable stacker for a cable processing device according to FIG. 1, with a modified counter barrier, with a flat band belt, in a sectional view (Y-Z plane), FIG. 9a shows an alternative embodiment of a cable stacker for a cable processing device according to FIG. 1 with the counter barrier in a first position, in a sectional view (Y-Z plane), FIG. 9b shows the cable stacker according to FIG. 9a, with the counter barrier in a second position, in a sectional view (Y-Z plane), FIG. 9c shows the cable stacker according to FIG. 9a, with the counter barrier in a third position, in a sectional view (Y-Z plane), FIG. 10a shows an alternative embodiment of a cable stacker for a cable processing device according to FIG. 1, with an expanded guide element in a first position, in a sectional view (Y-Z plane), and FIG. 10b shows the cable stacker according to FIG. 10a, with the expanded guide element in a second position, in a sectional view (Y-Z plane).

FIG. 1 and FIG. 2 show a first embodiment of a cable processing device 90 with a cable stacker 20 according to the invention, in a top view (XY plane, FIG. 1) and in a side view (XZ plane, FIG. 2). For a better view of the inner functional elements of the cable stacker 20, the protective cover 25 (visible in FIG. 3) is hidden. The cable processing stations 70, 71 and the control devices 29, 99 are only shown schematically; hoses, control cables and other details that are irrelevant to the invention are also not shown.

The cable processing device 90 is designed as a swivel arm machine and consists of two swivel arms 60, 61 which move or swivel the two ends of the cable 80 (not shown) to the respective cable processing stations 70, 71. After processing in the cable processing stations 70, 71, the cable 80 is transferred to the cable stacker 20. This consists of a first belt conveyor 21, which conveys the cable 80 along the conveying direction X. The first belt conveyor 21 comprises a belt 211, two matching conveyor rollers or deflection rollers 213a, 213b and a drive device 214 for actively rotating one of the two deflection rollers 213a. The drive device 214 has an electric motor, for example, with an integrated transmission, as a drive. The conveyor path 22 of the cable stacker 20 comprises an input path portion 221 and an output path portion 222. In the input path section 221, the cable 80 is dropped by the dropping device 60, wherein in this embodiment a swivel arm of the cable processing device 90 takes over the function of this dropping device 60.

Alternatively to this, the dropping device 60 can also be an independent assembly which is arranged on the cable stacker 20. This is appropriate and is necessary with alternative cable processing devices (not shown), designed for example as a transfer or rotary transfer machine.

The dropped cables 80 fall into the collection area 24, which typically comprises a tiltable collecting trough 241 (FIG. 3).

In order to prevent cables 80 from falling unintentionally and/or prematurely from the first belt conveyor 21, a drop barrier device 30 with a first drop barrier 31a and a first counter barrier 40 is provided at least in the input area 221. The first drop barrier 31a is used to prevent an uncontrolled slipping of the cable 80 from the conveyor path 22, wherein the first drop barrier 31a is movable relative to the counter barrier 40a. The drop barrier device 30 is arranged in the area of the deflection roller 213b, which moves passively with the belt 211.

In order to control all the sensors and drive elements of the cable stacker 20, these are electrically connected to a control device 29. This control device 29 is part of the cable stacker 20 and is in turn connected to a central control 99 of the cable processing device 90.

Alternatively to this, the local control device 29 in the cable stacker 20 can be dispensed with. For this purpose, the control cables of all the sensors and drive elements of the cable stacker 20 are electrically connected directly to the central control 99 of the cable processing device 90.

FIG. 3 shows schematically the cable stacker 20 of FIG. 2 in a sectional view, along the sectional plane (A-A), with the processed cable 80 and a protective cover 25, wherein the first drop barrier 31a is located in the inactive position or passive position (down) and the collecting trough 241 is shown folded up, so that a dropped cable 80 can be stored in the collecting trough 241. FIG. 4 shows the cable stacker 20 in an isometric sectional view wherein the protective cover 25 and cable 80 are hidden, but with the first drop barrier 31a in the active position (up) and the collecting trough 241 folded down.

The first drop barrier 31a is moved by a drive device 32a. This drive device 32a consists of two pneumatic cylinders 321a, 321b (only visible in FIG. 4), which are connected to a valve manifold 322 via hoses 323 (shown schematically in FIG. 3). This valve manifold 322 is in turn electrically connected to the control device 29, 99 with the aid of the control cable 332. In order to reliably detect the two end positions of the pneumatic cylinders 321a, 321b and thus when the drop barrier 31a has reached the active and inactive position, a sensor device 33 is provided. This typically consists of two sensors 331 per pneumatic cylinder 321a (shown schematically in FIG. 3) and the associated control cables 332, which also electrically connect the sensors 331 to the control device 29, 99. These sensors 331 are designed as magnetic proximity switches and are fastened in grooves provided for this purpose in the pneumatic cylinders 321a, 321b. Alternatively, in order to save costs, only one sensor 331 per pneumatic cylinder 321a, 321b can be used, which detects either the active or the inactive position of the drop barrier 31a.

In order to prevent an undesired dropping of the cable 80 from the belt conveyor 21, this is tilted with respect to the main frame 23 and the horizontal Y tilted by the tilt angle a, which is 6° here. The tilted coordinate system is identified by the letters Y' and Z' and is tilted about the X axis with the tilt angle a with respect to the normal coordinate system Y, Z (horizontal, vertical).

The counter barrier 40 also serves to prevent the cable 80 from falling down on the opposite side. The belt 211 designed as a flat band belt 211f overlaps the counter barrier 40 in its width direction Y' and the gap SZ between flat band belt 211f and counter barrier 40 is in the Z' direction. As a result, lateral guidance of the flat band belt 211f can be dispensed with (as in FIG. 8b) and the width of the flat band belt 211f need not have a particularly precise tolerance. Also, a simple and inexpensive flat band belt 211f can be used instead of an expensive belt having a longitudinal profile 211w (as in FIG. 8a). In order to set the gap SZ as small as possible and thus prevent jamming of the cables 80 in this gap SZ, the counter barrier 40 can be adjusted via an adjustment mechanism 41 (shown schematically as a block arrow, details in FIG. 9a and FIG. 9b) perpendicular to the flat band belt 211f (i.e. in the Z' direction) can be set precisely, easily and reproducibly. Thus, flat band belts 211f of different thicknesses can be used, which enables these flat band belts 211f to be procured under favourable conditions. The replacement of a flat band belt 211f that is only partially worn (with a reduced thickness due to signs of abrasion) can also be delayed a little further by adjusting the gap SZ with the aid of the adjustment mechanism 41.

In an alternative embodiment of the cable stacker (FIG. 9a, FIG. 9b), the counter barrier 40 described here with the associated adjustment mechanism 41 can also be described without the combination with a drop barrier 31 or drop barrier device 30.

The flat band belt 211f has, in particular, a special surface condition which enables a particularly high coefficient of friction with the cable 80 in the conveying direction X. Furthermore, the surface condition of the flat band belt 211f is configured in such a manner, on the one hand, to keep wear and tear as low as possible and thus enable a long service life, and on the other hand to touch the cable 80 as gently as possible so as not to cause any damage there.

The cables 80 are moved in the direction of the collection area 24 (solid arrow) when they are dropped and then fall into the collection area 24 in which the tiltable collecting trough 241 is arranged. The tilting takes place with the aid of a drive 242, designed here as a pneumatic cylinder, and in turn connected to the valve manifold 322 and the control device 29, 99 with hoses, sensors and control cables (not shown). Typically located underneath the tiltable collecting trough 241 is another trough (not shown) for removal of the cables by the user.

The tiltable collecting trough 241 has a fixing device 35. The fixing device 35 fixes the first drop barrier 31a in its inactive position.

As an alternative to this (not shown), such a fixing device can also be configured in such a way that it fixes the first drop barrier 31a in the active position (up). In an extended embodiment (not shown), the fixing device can also be designed in such a manner that the movement of the collecting trough 241 is mechanically coupled to the movement of the drop barrier 31a and therefore only one drive is necessary for both movements, i.e. the drive device 32a can be omitted and/or be replaced by a simple, passive force element (e.g. a spring).

In order to improve safety for the user and to prevent the cable 80 from shooting out beyond the collection area 24, a protective cover 25 is provided (shown schematically). The protective cover 25 typically contains transparent areas in order to enable the user to visually observe the process even when closed and can be folded up for service purposes. For this purpose the protective cover 25 is openable/closable using a hinge, and is provided with a latching and/or spring mechanism with integrated damping elements (e.g. gas pressure springs, not shown), which fixes the unfolded position and/or reduces the expenditure of force when unfolding or distributes it more evenly over the entire movement. The protective cover 25 is preferably connected to the main frame 23. In order to further improve the placement quality, a guide element 50 is preferably also integrated in this protective cover 25 (FIG. 9).

FIG. 5a and FIG. 5b show the elements of the cable stacker 20 to the left of the sectional plane A-A (FIG. 2), i.e. as in FIGS. 3 and 4, in a detailed side view (XZ plane). In both figures, the processed cable 80 and the protective cover 25 are not shown and the collecting trough 241 is folded down (as in FIG. 3). In FIG. 5a, the first drop barrier 31a is in the active position (up); and in FIG. 5b the first drop barrier 31a is in the inactive position (down, FIG. 5b). The first drop barrier 31a is a long plate, which can be moved orthogonally to the conveying direction X from the active position into an inactive position (represented by bold arrows in the Z direction). The pneumatic cylinders 321a, 321b are arranged at the two opposite ends of the first drop barrier 31a, which are connected to the main frame 23 and move the entire first drop barrier 31a uniformly. Guide grooves 311a, 311b, 311c, through which guide attachments 231a, 231b extend, are arranged on the first drop barrier 31a.

The method for safely transporting a cable 80 on the cable stacker is illustrated using the example of the cable stacker 20 according to FIGS. 1 to 5b and comprises at least the following steps:

a) selecting at least one cable parameter retrieved from a database;

b) moving the first drop barrier 31a relative to a counter barrier 40 into an active position;

c) conveying the cable 80 on the first belt conveyor 21.

The control device 29 or the central control 99 are connected to the database for exchanging cable parameters, so that cable parameters that have already been stored can be accessed.

After step c), at least one cable processing tool of a cable processing station 70 for the trailing end of the cable 80 is activated.

After conveying the cable on the first belt conveyor 21 (step c)), the step of transferring the first drop barrier (31a) into an inactive position (step d, FIG. 5b) follows and then or after completion of all the processing of the trailing cable end, dropping of the cable 80 with the dropping device 60, preferably integrated in the swivel arm for the cable processing stations 70 of the trailing end of the cable (step e)). The cable is thus reliably dropped without getting caught on the drop barrier.

The transfer of the first drop barrier (31a) into an inactive position (step d, FIG. 5b) takes place before the processing of the trailing end of the cable 80 in the cable processing stations 70 (FIG. 1) provided for this purpose. Steps a) and b) are preferably carried out in parallel or at the same time as the processing of the leading end of the cable 80 in the cable processing stations 71 provided for this purpose (FIG. 1). As a result of the parallel execution of the steps, cycle time is saved.

FIGS. 6a and 6b show an alternative embodiment of a cable stacker 20a with an alternative drop barrier device 30a, in a detailed side view (XZ plane), and once again with the drop barrier 31c shown in the active position (top, FIG. 6a) and shown once in the inactive position (bottom, FIG. 6b). The collecting trough is not shown.

The alternative drive device 32b for the alternative drop barrier device 30a contains a single pneumatic cylinder 321c which moves the alternative drop barrier 31c on one side. On the other side, the alternative drop barrier 31c is rotatably mounted, for example by means of a slide bearing 34. In order to prevent overdetermination and thus keep the movement running smoothly, some play in the X direction is provided in the area of the slide bearing 34, for example through an elongated hole (not shown) in the drop barrier 31c. Furthermore, the drop barrier 31c is fastened to the pneumatic cylinder 321c in such a way that small rotations around the Y' axis are made possible by means of an elastic design or by using an additional swivel joint (not shown).

FIG. 7a and FIG. 7b show two further alternative embodiments of a cable stacker 20b, 20c in a schematic side view (XZ plane), constructed here in a modular design, once with a plurality of module frames 212 in a single belt conveyor 21d (cable stacker 20b, FIG. 7a) and once with a plurality of belt conveyors 21a, 21b, 21c and a plurality of drop barriers 31a, 31b (cable stacker 20c, FIG. 7b).

The alternative cable stacker 20b according to FIG. 7a consists of only a single belt conveyor 21d. The structure of this belt conveyor 21d is modular with three module frames 212. This belt conveyor 21d contains only a single flat band belt 211f, with only a single drive device 214 and two deflection rollers 213a, 214b and an associated tensioning system for tensioning the flat band belt (not shown). The counter barriers 40a are also modular, having the same lengths as the respective module frames 212.

The alternative cable stacker 20c according to FIG. 7b consists of three belt conveyors 21a, 21b, 21c. All of these belt conveyors 21a, 21b, 21c use the same flat band belt 211f, with only a single drive device 214 and two deflection rollers 213a, 214b and an associated tensioning system for tensioning the flat band belt (not shown). The counter barriers 40a are also of modular design, having the same lengths as the respective belt conveyors 21a, 21b, 21c. In addition, a second drop barrier 31b is provided in the cable stacker 20c, with an associated drive and sensor device (not shown), which structurally and functionally corresponds to the first drop barrier 31a.

In both of the embodiments described previously, it is also possible to arrange two or more than two modules next to one another in order to increase the length of the conveyor path.

FIGS. 8a and 8b show two further alternative embodiments of a cable stacker 20d, 20e, which are constructed substantially functionally and structurally like the previously described cable stacker 20 according to FIGS. 1 to 5b, wherein an alternatively designed counter barrier 41a is provided. FIG. 8a shows the cable stacker 20d with a belt having a longitudinal profile 211w and FIG. 8b shows the cable stacker 20e with a flat band belt 211f and a lateral guide 215. Both cable stackers are shown only schematically in a sectional view in the YZ plane. This embodiment can be used at least in combination with the alternatives in the drop barrier (FIG. 6a and FIG. 6b) and/or in combination with the variants in the modular structure (FIG. 7a and FIG. 7b).

In contrast to the embodiment of the cable stacker 20 with flat band belts 211f (FIG. 3), a belt having a longitudinal profile 211w is used in the cable stacker 20d shown in FIG. 8a. The hitherto conventional embodiment (prior art) is now supplemented with a movable counter barrier 40a. This belt with a longitudinal profile 211w is spaced apart from the counter barrier 40a in the Y' direction, or the gap SY is formed there. In comparison to flat band belts 211f, belts of this type with a longitudinal profile 211w are somewhat more expensive, more difficult to obtain from only a few manufacturers, more complex to assemble and wear out more quickly.

The cable stacker 20e shown in FIG. 8b represents the embodiment in which the belt with longitudinal profile 211w is replaced by a flat band belt 211f, but the counter barrier 40a is still configured as in the alternative cable stacker 20d from FIG. 8a. Here again, the gap SY is formed in the Y' direction, in which the cable 80 (not shown) can now become jammed due to the longitudinal profile no longer being present—which would lead to disruptions. In order to ameliorate this problem, a lateral guide 215 is provided.

An adjusting mechanism 41a for the counter barrier 40a is arranged on the two other embodiments of the cable stacker 20d (FIG. 8a) and the cable stacker 20e (FIG. 8b). This alternative adjustment mechanism 41a differs from the adjustment mechanism 41 of the embodiment of the cable stacker 20 according to FIG. 3 in that it allows a displacement of the counter barrier 40a in the Y' direction and thus creates a gap SY between the belt front surface 2112 and the counter barrier 40a whereas the adjustment mechanism 41 in the embodiment of the cable stacker 20 allows a displacement of the counter barrier 40 in the Z' direction and thus produces a gap SZ between the belt transport surface 2111 and the counter barrier 40.

FIGS. 9a to 9c show another embodiment of a cable stacker 20f, which does not comprise a drop barrier, but has substantially the same functional and structural elements as the cable stacker according to FIGS. 1 to 5b, in a sectional view in the YZ plane with the sectional plane defined by the position of a screw 411 of the adjustment mechanism 41. Also shown are the elements of the adjustment mechanism 41 and the method for adjusting the desired gap SZ.

The main body of the adjustment mechanism 41 is connected to the counter barrier 40 and comprises at least one elongated hole 413 which allows adjustment/displacement in the Z' direction. The adjustment mechanism 41 is connected to the main frame 23 of the cable stacker 20f in the area of this elongated hole 413 with the aid of at least one screw 411 and one washer 412 as a fastening device. The washer 412 is configured here so that the screw 411 does not loosen in the event of vibrations, for example as a ribbed washer or as a wedge lock washer (Nord-Lock). A plurality of screws 411, washers 412 and elongated holes 413 are provided for each adjustment mechanism 41 (only one is visible in this sectional view). If all the screws 411 are slightly loosened by the user (FIG. 9a), then the adjustment mechanism 41 and the counter barrier 40 attached thereto can be freely moved in the Z' direction, for example by a user. As soon as the screws 411 are tightened (FIG. 9a, FIG. 9b), the counter barrier 40 is fixed and clearly positioned relative to the main frame 23 and the remaining elements of the cable stacker 20f.

In order to set the desired gap SZ between the belt transport surface 2111 of the flat band belt 211f and the counter surface 40, the adjustment mechanism 41 comprises an adjustment aid 414. For this purpose, all the screws 411 are firstly loosened slightly and the adjustment mechanism 41 with the counter barrier 40 is displaced so that the gap between the flat band belt 211f and the counter barrier 40 is at its maximum. The adjustment aid 414 is pushed into this gap (FIG. 9a), preferably by hand by the user. The counter barrier 40 is then pushed back in the opposite direction (arrow in the Z' direction) up to the stop, i.e. until the counter barrier 40, adjustment aid 414 and flat band belt 211f touch each other. Then, all the screws 411 are tightened again (arrow in the Y' direction).

The position with the adjustment aid 414 still in position but the screws 411 already tightened is shown in FIG. 9b. Before starting up, the adjustment aid 414 is pulled out or removed (arrow in the Y' direction).

The position with the adjustment aid 414 removed is shown in FIG. 9c. The gap SZ is formed between the belt transport surface 2111 of the flat band belt 211f and the counter barrier 40. This corresponds approximately to the thickness of the adjustment aid 414 and is independent of the thickness of the flat band belt 211f. Thus, a reproducible gap SZ of the optimum size for flat band belts 211f from different manufacturers can be produced at any time and with little effort. In the event of severe wear of the flat band belt 211f (reduced thickness due to wear/abrasion), the adjustment process can also be repeated several times for the same flat band belt 211f.

In a further, alternative embodiment of a cable stacker as described above, a sensor device is additionally provided by means of which the gap between a belt and the counter barrier can be detected (not shown). The sensor device comprises a distance sensor for detecting the distance between the belt and the first counter barrier and sends the sensor data to the control device. The control device comprises a computing unit and is connected to a database for the exchange of control data. The control data comprise control commands for controlling the drive device of the counter barrier and/or control commands for controlling the conveyor rollers of the belt conveyor. The computing unit has a program that is suitable for evaluating the sensor data and calculating a gap width and comparing it with a reference value. For example, the sensor device comprises an imaging sensor, such as a camera.

FIG. 10 (a-b) shows a further embodiment of a cable stacker 20g with an actively movable guide element 50 which is arranged on the protective cover 25. This guide element 50 is embodied here as a sliding plate and serves to improve the guidance of the cable 80 (not shown) in the input path section 221 during dropping and thus to ensure an optimal deposition quality. The optimal position of this guide element 50 is here dependent on the cable length as a cable parameter.

Therefore, the guide element 50 is configured so that it can be displaced in the X-direction (represented by the bold arrow). In FIG. 10a, the guide element 50 is shown in the first position, in which the first guide element is positioned close to the first deflection roller 213b and in FIG. 10b is positioned in the other position, further away from the first deflection roller 213b.

So that the user does not forget this displacement, it is advantageous to detect the position of the guide element 50 or a detection element 501 arranged thereon (for example, a magnet) using a sensor device 52 and/or to actively drive the movement of the guide element 50 using a drive device 51, both electrically connected to the control device 29, 99 of the cable stacker 20 or the cable processing device 90. Alternatively to this, the detection element can be integrated in the drive device, preferably in the cylinder piston of the pneumatic cylinder.

In a supplementary embodiment (not shown), this drive device 51 is designed as an electric drive axle and the sensor device 52 as a rotary encoder or absolute value encoder. Thus, the position of the guide element 50 can be actively adjusted, and specifically steplessly or with any number of positions.

In a further embodiment (not shown) a drive device is dispensed with and the sensor device consists of at least one binary sensor for a position of the first guide element. If this position does not match the currently processed cable length, the cable stacker or its drive devices or the cable processing device or its drive devices stops and informs the user that the guide element must be moved to the correct position.

In an extended embodiment (not shown), a plurality of sensors are installed or an absolute value encoder, in which case a drive device can still be dispensed with.

An embodiment is shown schematically in FIGS. 10a and 10b, which can move to two positions which can be actively driven. The drive device 51 is designed as a pneumatic cylinder, which is connected via hoses 323 to the same valve manifold 322 as most of the other pneumatic cylinders of this cable stacker 20g. The sensor device 52 consists of two binary sensors or limit switches, which are arranged so that they send a signal at the respective end positions. An arrangement in the area of guide element 50 is shown here.

Alternatively to this, the sensor device 52 can also be integrated in the area of the pneumatic cylinder, as shown in FIG. 3 for the drive device 32a. Here also, the valve manifold 322 and the sensor device 52 are electrically connected to the control device 29, 99 (not shown) via control cable 332.

Alternatively to integrating the guide element 50 into the protective cover 25, this can also be attached to another element of the cable stacker. It is also possible to use a plurality of guide elements per cable stacker.

The method for safely conveying a cable 80 on the cable stacker is illustrated using the example of the cable stacker 20g according to FIGS. 10a and 10b and comprises at least the following steps:

a) transferring the first guide element 50 into a first position, the first position being matched to the cable length of the cable 80 to be conveyed;

b) checking the first position of the first guide element 50 using the sensor device 52;

c) transferring control data to the control device 29, 99;

d) conveying the cable on the first belt conveyor.

Before step a), at least one cable parameter of the cable can be selected, for example from a database which is stored in the control device 29, 99. The control device 29 or the central control 99 are connected to the database for the exchange of cable parameters. The first guide element 50 is transferred into the first position (step a) with the aid of the drive device 51.

REFERENCE LIST 20, 20a-g Cable stacker
21, 21a-d Belt conveyors

211 Belts
211f Flat band belt
2111 Belt transport surface
2112 Belt front surface
211w Belt with longitudinal profile (belt bead)
212 Module frame
213, 213a-b Deflection roller (conveyor roller)
214 Drive device (electric motor)
215 Lateral guide
22 Conveyor path
221 Input path portion
222 Output path portion
23 (Main) frame
231, 231a-b Guide attachments
24 Collection area
241 Collecting trough (tilting trough)
242 Drive (for 241)
25 Protective cover
29 Control device
30, 30a Drop barrier device
31 Drop barriers
31a-c Drop barriers
311, 311a-c Guide grooves
32, 32a-b Drive device
321, 321a-c Pneumatic cylinders
322 Valve (manifold)
323 Hose(s)
33 Sensor device
331 Sensor(s) (for 31)
332 Control cable
34 Slide bearings
35 Fixing device
40, 40a Counter barrier
41, 41a Adjustment mechanism
411 Screw
412 Washer
413 Elongated hole
414 Adjustment aid
50 (First) guide element (guide plate)
501 Detection element (detection area)
51 Drive device (for 50)
52 Sensor device (for 50)
60 Dropping device (swivel arm)
61 Main swivel (swivel arm)
70 Cable processing station(s)
71 Cable processing station(s)
80 (Processed) cable
90 Cable processing device
99 Central control
A Sectional plane
a Tilt (s-angle)
SY, SZ Gap
X (Conveying) direction for 80
Y Direction (horizontal, transverse to X)
Y' Direction (parallel to belt, transverse to X)
Z Direction (vertical)
Z' Direction (orthogonal to belt, transverse to X)

The invention claimed is:

1. A cable stacker (20) having a first belt conveyor (21a) for conveying a cable (80) along a conveying direction (X), wherein the first belt conveyor (21a) has a conveyor path (22) with an input path portion (221) and an output path portion (222) and a main frame (23) is provided, on which the first belt conveyor (21a) is arranged, wherein a counter barrier (40a) is provided on a first side of the first belt conveyor for guiding the cable (80) along the conveyor path (22), a first drop barrier (31a) is arranged on the main frame

(23) in a region of the input path portion (221) of the first belt conveyor (21*a*), positioned on a second side of the first conveyor belt opposite the first side, to prevent uncontrolled slipping of a leading end of the cable (80) from the conveyor path (22) into a collection area (24) for collecting the cables (80), and wherein the first drop barrier (31*a*) is movable relative to the counter barrier (40; 40*a*) into an active position for preventing during dropping of the leading end of the cable the uncontrolled slipping of the leading end of the cable (80), and wherein the first drop barrier (31*a*) is movable orthogonally to the conveying direction (X) of the conveyor path (22) from the active position into an inactive position below the conveyor path (22) allowing slipping of the cable (80) into the collecting area (24) and/or movable along the conveying direction (x) of the conveyor path (22).

2. The cable stacker (20) according to claim 1, wherein the first drop barrier (31*a*) is mechanically connected to a drive device (32*a*) having at least one drive for moving the first drop barrier (31*a*).

3. The cable stacker (20) according to claim 2, wherein this drive device (32*a*) is a pneumatic drive device which has at least a pneumatic cylinder (321*a*, 321*b*, 321*c*) and a valve (322).

4. The cable stacker (20) according to claim 1, wherein a sensor device (33) is provided by means of which at least the inactive position and/or the active position of the first drop barrier (31*a*) is detectable.

5. The cable stacker (20) according to claim 1, wherein the counter barrier (40*a*) is movably arranged on the first belt conveyor (21*a*).

6. The cable stacker (20) according to claim 1, wherein the first belt conveyor (21*a*) is arranged on the main frame (23) tilted relative to the horizontal, wherein the tilt (a) is between 1 degree and 15 degrees.

7. The cable stacker (20) according to claim 6, wherein the tilt (a) is 6 degrees.

8. The cable stacker (20) according to claim 1, wherein the first drop barrier (31*a*) is arranged adjacent to the collection area (24) and the collection area (24) is designed as a movable collecting trough (241).

9. The cable stacker (20) according to claim 1, wherein at least one fixing device (35) is provided for fixing at least the first drop barrier (31*a*) in the active position.

10. The cable stacker (20) according to claim 1, wherein the first belt conveyor (21*a*) comprises a plurality of module frames (212) which are connectable to the main frame (23), wherein the module frames (212) are arranged to be separable from one another and/or from the main frame (23).

11. The cable stacker (20) according to claim 1, wherein at least one guide element (50) is provided and in the region of the guide element (50) a sensor device (52) with at least one sensor for determining a first position of the guide element (50) is provided, wherein the sensor device (52) is electrically connected to a control device (29, 99) of the cable stacker or to a central control (99) of a cable processing apparatus (90) and/or a drive device (51) for moving the first guide element (50) is connected to the first guide element (50).

12. The cable stacker (20) according to claim 1, wherein the counter barrier (40*a*) is movable relative to the conveying direction (X) in order to set a gap (SY, SZ) to the conveying path of the first belt conveyor (21*a*).

13. The cable stacker (20) according to claim 12, wherein the counter barrier is movable perpendicularly to the conveying direction, in order to vertically set a horizontal gap (SZ) between the first belt conveyor (21*a*) and the counter barrier (40*a*).

14. A method for safely conveying a cable (80) on a cable stacker (20) according to claim 1 as part of a cable processing device (90), wherein the cable stacker (20) has at least the first belt conveyor (21*a*) and the first drop barrier (31*a*), wherein the method comprises the following steps:

a) selecting at least one cable parameter, wherein the at least one cable parameter is retrieved from a database b1) transferring the first drop barrier (31*a*) into an active position relative to a counter barrier (40)

b2) dropping a leading end of the cable (80) on an input path portion (221) of the first belt conveyor (21*a*)

c) conveying the cable (80) on the first belt conveyor (21*a*).

15. The method according to claim 14, wherein at least one of the steps takes place after step c):

d) transferring the first drop barrier (31*a*) into an inactive position e) dropping the cable (80) with a dropping device (60).

16. A cable processing apparatus (90) comprising at least one cable processing station (70, 71) with at least one cable processing tool for processing the cable (80) and a cable stacker (20) according to claim 1, wherein a dropping device (60) is provided for dropping the cable (80) from the first belt conveyor (21*a*, 21*b*, 21*c*) arranged on the cable processing device (90) or for dropping the cable (80) on the cable stacker (20), which dropping device is connected to a control device (29) of the cable stacker (20) for the exchange of control data or the dropping device is electrically connected to a central controller (99) of the cable processing device (90) for the exchange of control data.

17. A method for safely conveying a cable (80) onto a cable stacker (20) as part of a cable processing apparatus (90) according to claim 16, wherein the method comprises the following steps:

a) selecting at least one cable parameter, wherein the at least one cable parameter is retrieved from a database b) transferring the first drop barrier (31*a*) into an active position relative to a counter barrier (40)

c) conveying the cable (80) on the first belt conveyor (21*a*).

* * * * *